(12) United States Patent
Tiefenthaler (10) Patent No.: US 8,746,485 B1
(45) Date of Patent: Jun. 10, 2014

(54) SNAP-ON FUEL CAP COVER

(71) Applicant: Briggs & Stratton Corporation, Wauwatosa, WI (US)

(72) Inventor: Carl Tiefenthaler, Jackson, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 13/689,018

(22) Filed: Nov. 29, 2012

(51) Int. Cl.
*B65D 51/18* (2006.01)
*B65D 41/04* (2006.01)

(52) U.S. Cl.
USPC ............. 220/288; 220/254.1; 220/254.7; 220/254.8; 220/255; 220/256.1; 220/259.3; 220/259.4

(58) Field of Classification Search
USPC ............ 220/254.1, 254.7, 254.8, 255, 256.1, 220/259.3, 259.4, 288, DIG. 33; 215/220, 215/277, 302, 305
See application file for complete search history.

(56) References Cited

U.S. PATENT DOCUMENTS

| | | | |
|---|---|---|---|
| D212,843 S | 12/1968 | Hart et al. | |
| D359,682 S | 6/1995 | Miller | |
| D413,485 S | 9/1999 | Much | |
| 6,179,148 B1 | 1/2001 | Harris | |
| D487,700 S | 3/2004 | Bourque et al. | |
| D488,397 S | 4/2004 | Morelock | |
| D503,667 S | 4/2005 | Keefer et al. | |
| D526,564 S | 8/2006 | Slavin et al. | |
| D531,505 S | 11/2006 | Lohrman | |
| D566,640 S | 4/2008 | Holz et al. | |
| D576,878 S | 9/2008 | Brashear | |
| D585,348 S | 1/2009 | Yan et al. | |
| 7,481,321 B2 | 1/2009 | Ismert | |
| D594,395 S | 6/2009 | Yoshii | |
| D635,585 S | 4/2011 | Harmelink | |
| 8,096,438 B2 | 1/2012 | Schmalz et al. | |
| D655,310 S | 3/2012 | Tiefenthaler et al. | |
| D665,426 S | 8/2012 | Tiefenthaler et al. | |
| 8,517,200 B1 * | 8/2013 | Davis | 220/254.1 |
| 2006/0016436 A1 | 1/2006 | Groom et al. | |
| 2006/0086736 A1 | 4/2006 | Keller | |
| 2006/0124644 A1 | 6/2006 | Dehn | |
| 2010/0089919 A1 | 4/2010 | Dunkle et al. | |

OTHER PUBLICATIONS

Briggs & Stratton 700 Series DOV engine, www.usinenouvelle.com/industry/briggs-et-stratton-635/briggs-stratton-series-dov-p57879.html, retrieved on Jun. 14, 2011, 3 pages.
Professional Series 875 and 700 Series DOV engines, www.briggsandstratton.com/engines/push-mower, retrieved on Jun. 14, 2011, 4 pages.

* cited by examiner

*Primary Examiner* — Fenn Mathew
*Assistant Examiner* — Madison L Poos
(74) *Attorney, Agent, or Firm* — Foley & Lardner LLP (57) ABSTRACT

A fuel tank closure assembly includes an inner cap and an outer cover. The inner cap has a cylindrical side wall and multiple protrusions extending outward from the cylindrical side wall. The protrusions have a height less than a height of the cylindrical side wall. The outer cover has a cylindrical side wall with an inner diameter larger than an outer diameter of the inner cap. The cylindrical side wall has multiple openings and multiple hollows. The openings and the hollows in the outer cover each receive one of the protrusions to secure the cover to the cap and rotatably lock the cover and the cap together.

14 Claims, 7 Drawing Sheets

SNAP-ON FUEL CAP COVER

BACKGROUND

The present invention relates generally to the field of threaded closures for containers. Containers, such as fuel tanks for internal combustion engines, may be closed by a threaded lid or cap. These caps may have low profile designs to reduce the space requirements of the container. A common threaded connection may be used for fuel tanks in several varied fuel tank and engine configurations, making the low profile cap desirable because it can be utilized to close the fuel tank without worrying about clearance with the surrounding bodies. For example, a common threaded connection may be used for an engine/fuel tank package provided to multiple original equipment manufacturers (OEMs).

SUMMARY

One embodiment of the invention relates to a fuel tank closure assembly including an inner cap and an outer cover. The inner cap has a cylindrical side wall and multiple protrusions extending outward from the cylindrical side wall. The protrusions have a height less than a height of the cylindrical side wall. The outer cover has a cylindrical side wall with an inner diameter larger than an outer diameter of the inner cap. The cylindrical side wall has multiple openings and multiple hollows. The openings and the hollows in the outer cover each receive one of the protrusions to secure the cover to the cap and rotatably lock the cover and the cap together.

Another embodiment of the invention relates to a cover apparatus including a cap and a cover. The cap has multiple outwardly extending protrusions and is configured to engage a container with a threaded connection. The cover has multiple snap features and is configured to be coupled to the cap with a snap connection by engaging the protrusions with the snap features. The snap connection rotatably locks the cap to the cover such that the cap may be engaged with or disengaged from the container by rotating the cover.

Another embodiment of the invention relates to a snap-on fuel cap cover including a coupling portion and a grip portion. The coupling portion includes an opening configured to engage a first protrusion on a fuel cap, and a hollow configured to receive a second protrusion on the fuel cap. The grip portion extends from the coupling portion away from the fuel cap. The coupling portion is configured so that the interaction of the opening and the first protrusion and the interaction of the hollow and the second protrusion secures the coupling portion to the fuel cap such that the fuel cap may be rotated by grasping and rotating the grip portion.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
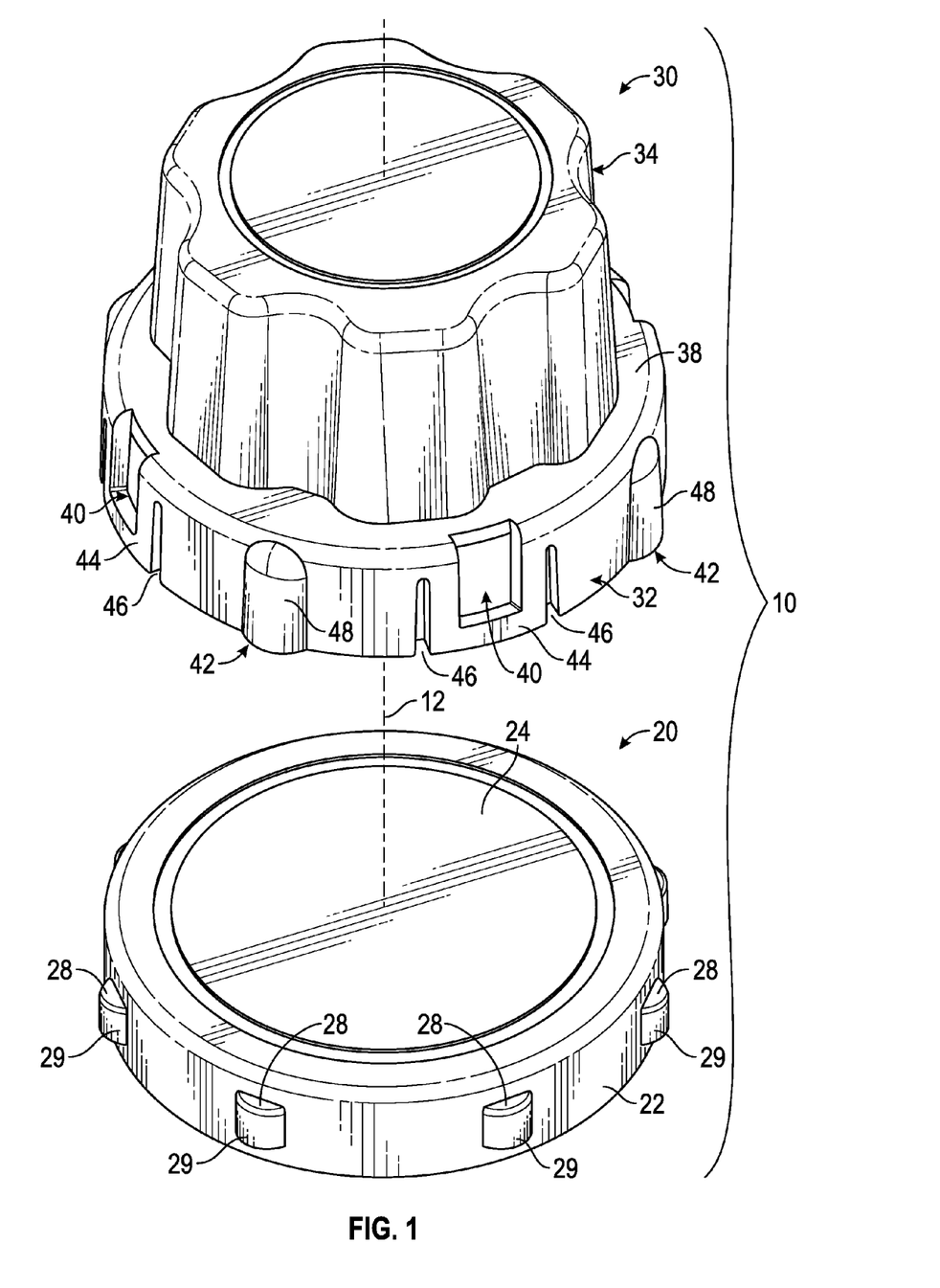
FIG. 1 is an exploded view of a snap-on fuel cover assembly, in accordance with an exemplary embodiment.
Figure 2:
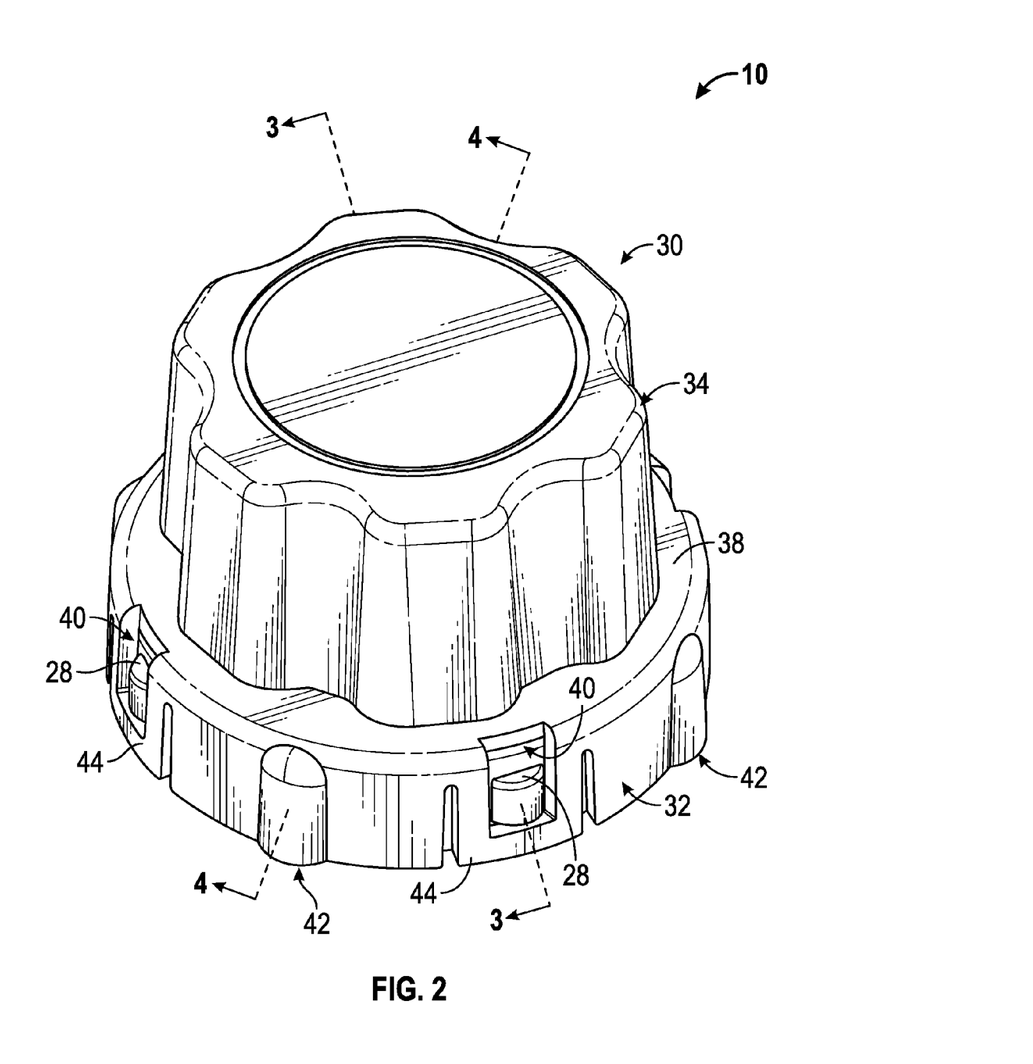
FIG. 2 is an isometric view of the snap-on fuel cover assembly of FIG. 1.
Figure 3:
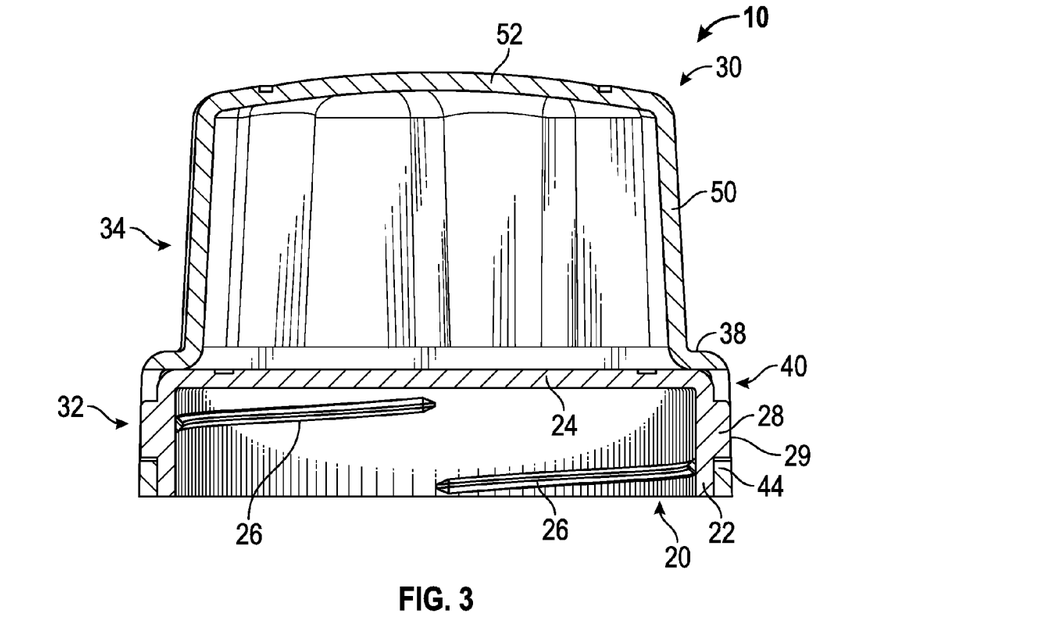
FIG. 3 is a sectional view of the snap-on fuel cover assembly of FIG. 1, taken along line 3-3.
Figure 4:
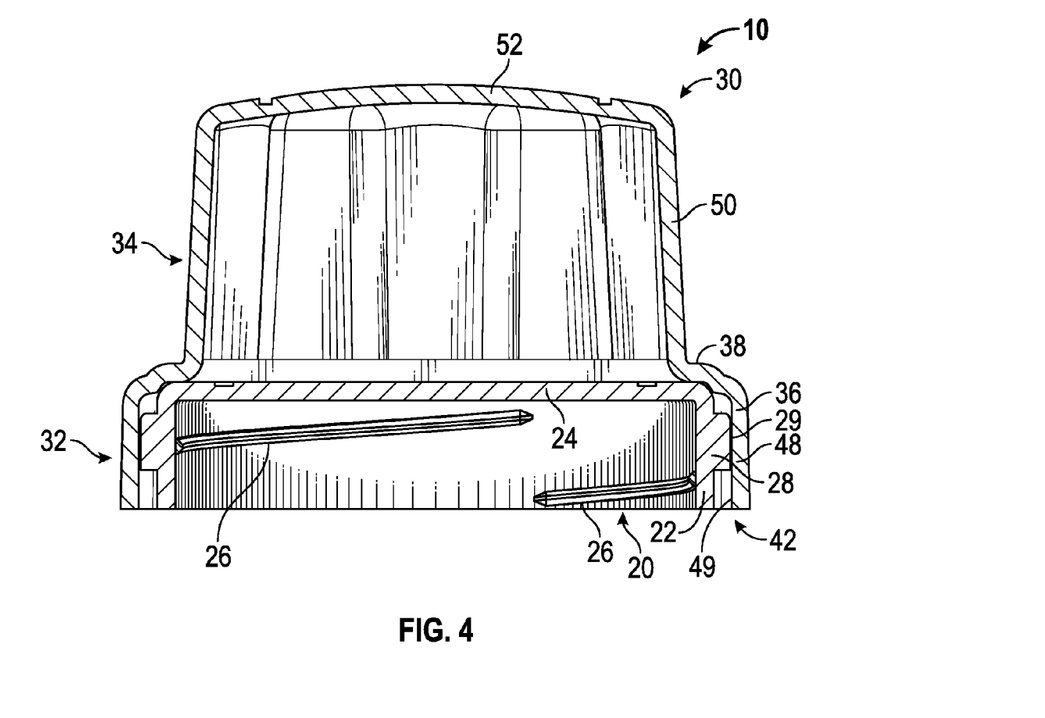
FIG. 4 is a sectional view of the snap-on fuel cover assembly of FIG. 1, taken along line 4-4.
Figure 5:
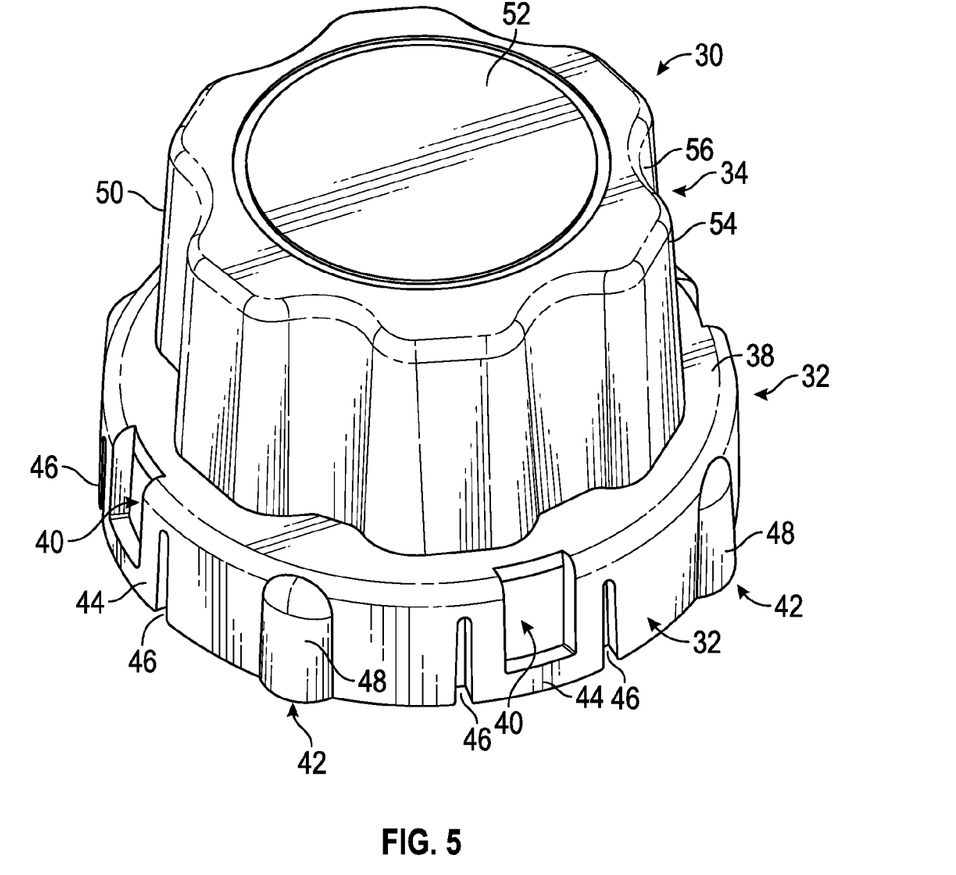
FIG. 5 is an isometric view of the cover for the snap-on fuel cover assembly of FIG. 1.
Figure 6:
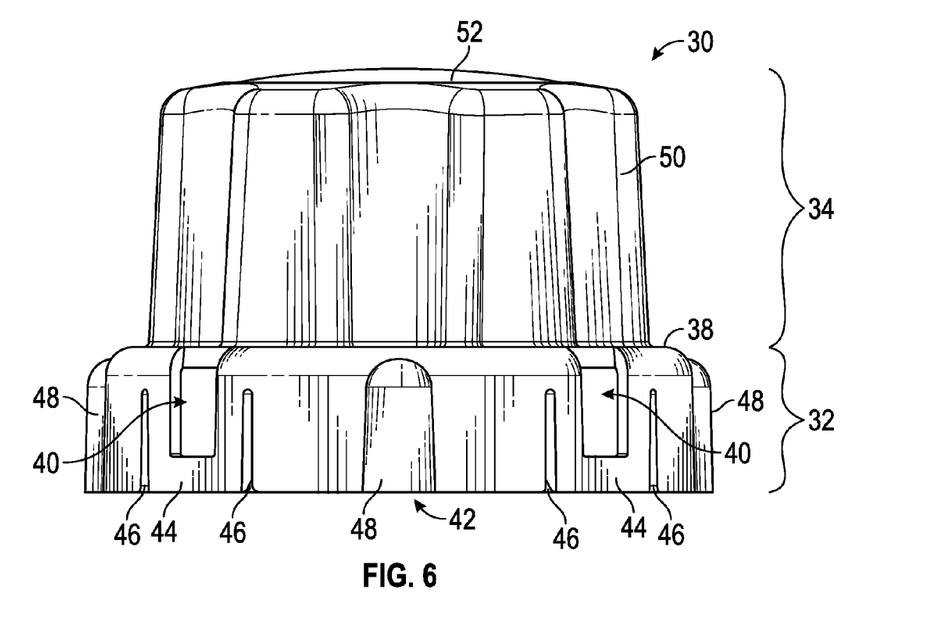
FIG. 6 is a front view of the cover for the snap-on fuel cover assembly of FIG. 5.
Figure 7:
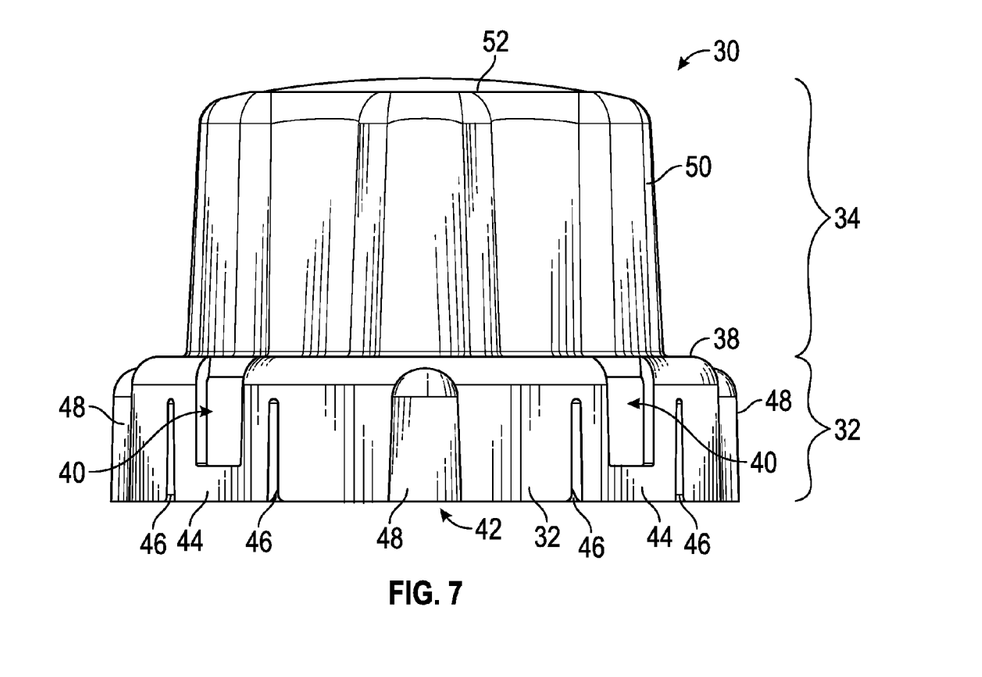
FIG. 7 is a side view of the cover for the snap-on fuel cover assembly of FIG. 5.
Figure 8:
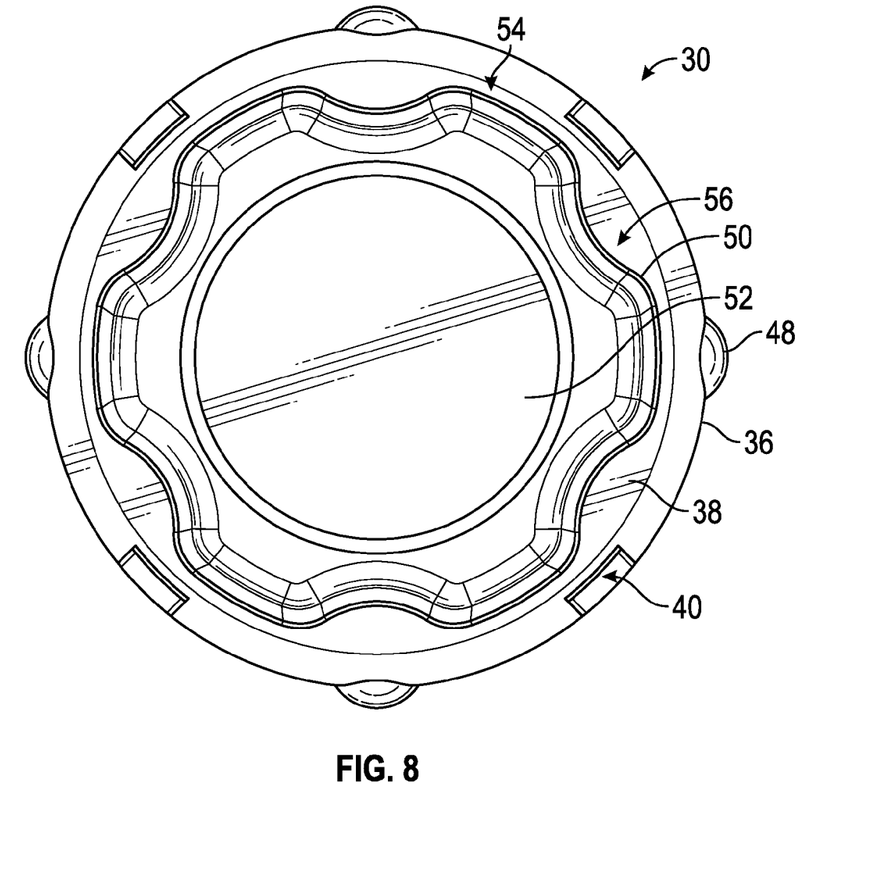
FIG. 8 is a top view of the cover for the snap-on fuel cover assembly of FIG. 5.
Figure 9:
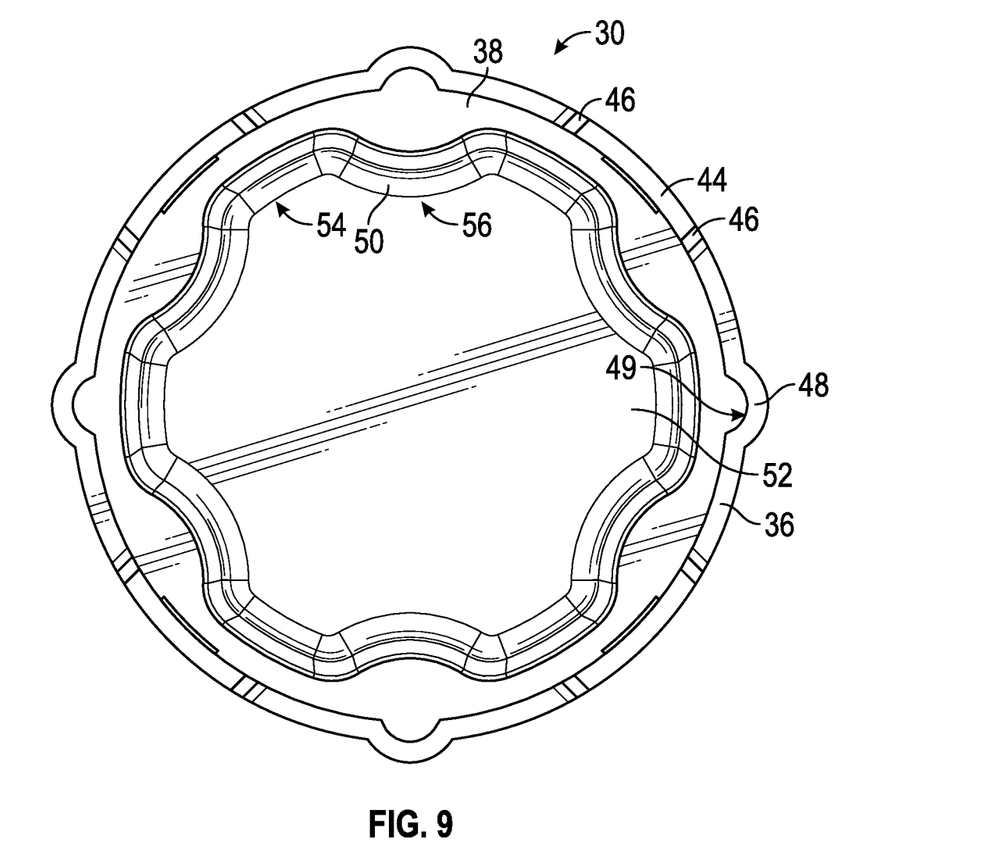
FIG. 9 is a bottom view of the cover for the snap-on fuel cover assembly of FIG. 5.

Referring to FIGS. 1-4, a closure assembly 10 is shown according to an exemplary embodiment to include a cover 30 that is configured to snap onto a fuel cap 20. The fuel cap 20 may be used to close an opening in a container (not shown), such as a fuel tank for an internal combustion engine. The fuel cap 20 is a low profile cap with a cylindrical side wall 22 and an end wall 24. The fuel cap 20 engages the container with a threaded connection utilizing internal threads 26, as shown in FIGS. 3 and 4 (e.g., by rotating the fuel cap 20 about an axis of rotation 12). The fuel cap 20 further includes multiple protrusions 28 (e.g., nubs, ridges, bumps, etc.). The protrusions 28 provide raised surfaces to facilitate the turning of the cap 20 by a user. According to an exemplary embodiment, the protrusions 28 have a length that is less than the height of the side wall 22 and has a convex cross-sectional shape (e.g., arcuate or circular segment) defined by a curved surface 29. In other exemplary embodiments, the protrusions 28 may have another cross-sectional shape (e.g., rectangular, semi-circular, trapezoidal, triangular, etc.). The protrusions 28 may be spaced equally about the periphery of the side wall 22. According to an exemplary embodiment, the fuel cap 20 has eight protrusions 28, each separated from the adjacent protrusions by forty-five degrees. In other exemplary embodiments, the fuel cap 20 may have more or fewer than eight protrusions 28. In some embodiments, the height of the protrusions 28 is less than the height of the cylindrical side wall 22.

The low profile of the fuel cap 20 minimizes the occupied volume and allows a single fuel cap design to be utilized for multiple engine and fuel tank designs. The cover 30 is coupled to the cap 20 and may be configured to have dimensions, colors, or shapes specific to a particular engine and fuel tank design. For example, an emblem, trademark, or other design may be found on or formed in the end wall 52.

In the embodiment shown in FIG. 2, the cover 30 is coupled to the fuel cap 20 with a snap connection. Referring now to FIGS. 5-9, the cover 30 is larger body with a higher profile to increase the surface area that may be gripped by the user, making it easier for the user to remove the fuel cap 20 from the container. The cover 30 includes a first portion or coupling portion 32 that connects the cover 30 to the fuel cap 20 and a second portion or grip portion 34 that is configured to be grasped by the user so that the user may rotate the closure assembly 10 to connect or disconnect the fuel cap 20 and the opening of the container.

The coupling portion 32 is shaped such that it may nest with the fuel cap 20 with a cylindrical side wall 36 and a generally annular end wall 38 that provides a transition between the side wall 36 and the grip portion 34. The side wall 36 has an inner diameter that is approximately equal to the outer diameter of the side wall 22 of the fuel cap 20. The protrusions 28 of the fuel cap 20 are received in openings 40 and hollows 42 in the side wall 36 to couple the cover 30 to the fuel cap 20. The openings 40 and the hollows 42 have a spacing corresponding to the protrusions 28 on the fuel cap 20. In an exemplary embodiment, the openings 40 and the hollows 42 alternate about the periphery or circumference of the coupling portion 32 of the cover 30 such that the cover 30 includes four openings 40 interspersed with four hollows 42.

Each of the openings 40 is partially defined by a U-shaped snap feature 44 formed in the side wall 36 and defined by a relief slot 46 on either side. The relief slots 46 may extend through the thickness of the side wall 36 or may be grooves that have a depth less than the thickness of the side wall 36. The relief slots 46 allow the snap feature 44 to flex outward as the cover 30 is pushed down onto the fuel cap 20 along the rotational axis 12. When the cover 30 is properly oriented with the fuel cap 20, a portion of the protrusions 28 are received in each of the opening 40. As shown in FIG. 3, the snap feature 44 engages the protrusion 28 and the end wall 38 of the coupling portion 32 contacts the end wall 24 of the fuel cap 20 to lock the cover 30 to the fuel cap 20 in the direction of the rotational axis 12.

The remainder of the protrusions 28 are received in the hollows 42 (e.g., receptacles, voids, spaces, sockets, etc.) instead of the openings 40. The hollows 42 are formed in the side wall 36 by a curved portion 48 that extends outward from the side wall 36. The hollows 42 have a concave cross-sectional shape (e.g., arcuate or circular segment) similar to the protrusions 28 such that the inner surface 49 of the curved portion 48 contacts the curved surface 29 of the protrusion 28 as shown in the FIG. 4. When the cover 30 is coupled to the fuel cap 20, the contact between the surfaces 29 and 49 cooperates with the snap features 44 to rotatably lock the cover 30 to the fuel cap 20. The surface to surface contact between the protrusions 28 and the curved walls 48 helps to fix the location of the cover 30 relative to the cap 20 and, by providing additional points of contacts between the cover 30 and the cap 20 distributes the torque applied the assembly 10 when the assembly 10 is rotated about the axis 12 among the snap feature 44 and protrusion 28 combinations and the hollow 42 and protrusion 28 combinations.

The grip portion 34 extends upward beyond the end wall 38 of the coupling portion 32 and includes a contoured side wall 50 and an end wall 52. The side wall 50 may have ridges 54 (e.g., raised portions) and depressions 56 (e.g., recessed portions) and the end wall 52 be shaped to match the contour of the side wall 50 (e.g., star-shaped). The contoured side wall 50 of the grip portion 34 increases the surface area that may be grasped by the user (i.e., compared to the side wall 22 of the fuel cap 20), and thereby increase the ease with which the user may connect or disconnect the fuel cap 20 and opening of the container. In other exemplary embodiments, the grip portion 34 may be otherwise shaped (e.g., cylindrical, frusto-conical, hexagonal, octagonal, etc.) and may have a surface texture (e.g., nubs, ridges, knurling, etc.).

The cover 30 is formed of a material that is sufficiently flexible to allow the cover 30 to be snapped onto the fuel cap 20 and sufficiently strong to transfer the torque applied by the user to the fuel cap 20 without warping and disengaging from the fuel cap 20. According to an exemplary embodiment, the cover 30 is formed of an injection-molded polymer. According to other exemplary embodiments, the cover 30 may be formed of a metal or metal alloy. In still other exemplary embodiments, the cover 30 may be formed of a composite material, such as a fiberglass-reinforced plastic.

The cover 30 may be customized to match an individual engine and fuel tank design. For example, the cover 30 may include indicia (e.g., a molded indicia, a printed indicia, etc.) such as an OEM logo. The cover 30 may be colored differently (e.g., painted or molded in a specific color) for different engine and fuel tank designs. The cover 30 may be provided as an aftermarket accessory or may be shipped together with the engine and assembled by the OEM or by the user. In this way, an OEM receiving a bulk shipment of engines or fuel tanks including the low-profile fuel cap 20 can customize the appearance of their product as needed by coupling an appropriate cover 30 to the fuel cap 20.

It is important to note that the construction and arrangement of the closure assembly as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fuel tank closure assembly, comprising:
    an inner cap comprising a cylindrical side wall and a plurality of protrusions extending outward from the cylindrical side wall, the protrusions having a height less than a height of the cylindrical side wall; and
    an outer cover comprising a cylindrical side wall with an inner diameter larger than an outer diameter of the inner cap, the cylindrical side wall having a plurality of openings and a plurality of hollows;
    wherein the openings and the hollows in the outer cover each receive one of the protrusions to secure the cover to the cap and rotatably lock the cover and the cap together to fix the location of the cover relative to the cap.

2. The fuel tank closure assembly of claim 1, wherein the protrusions are equally spaced about a circumference of the inner cap.

3. The fuel tank closure assembly of claim 2, wherein the protrusions have a curved outer surface.

4. The fuel tank closure assembly of claim 3, wherein the openings and the hollows are equally spaced about a circumference of the outer cover and alternate about the circumference of the cylindrical side wall of the outer cover.

5. The fuel tank closure assembly of claim 4, wherein the hollows have a curved inner surface shaped similarly to the curved outer surface of the protrusions.

6. The fuel tank closure assembly of claim 1, wherein the outer cover further includes a grip portion extending from the cylindrical side wall in a direction away from the inner cap.

7. The fuel tank closure assembly of claim 6, wherein the grip portion comprises a generally cylindrical body with a contoured side wall.

8. A cover apparatus, comprising:
a cap having a cylindrical side wall from which a plurality of protrusions extend outwardly, the cap configured to engage a container with a threaded connection; and
a cover having a plurality of snap features and a cylindrical side wall with an inner diameter larger than an outer diameter of the cap, wherein the cylindrical side wall of the cover includes a plurality of openings with each opening formed in one of the snap features, and a plurality of hollows, wherein each of the openings and the hollows is configured to receive one of the protrusions, wherein the plurality of openings and the plurality of hollows alternate about a circumference of the cylindrical side wall of the cover, and wherein the cover is configured to be coupled to the cap with a snap connection by engaging the protrusions with the snap features;
wherein the snap connection rotatably locks the cap to the cover such that the cap may be engaged with or disengaged from the container by rotating the cover; and
wherein the cap is configured to nest within the cover.

9. The cover apparatus of claim 8, wherein the protrusions have a height less than a height of the cylindrical side wall of the cap.

10. A snap-on fuel cap cover, comprising:
a coupling portion including an opening configured to engage a first protrusion on a fuel cap, a hollow configured to receive a second protrusion on the fuel cap, a cylindrical side wall configured to surround an outer periphery of the fuel cap, and a U-shaped snap feature that partially defines the opening in the cylindrical side wall; and
a grip portion extending from the coupling portion away from the fuel cap;
wherein the coupling portion is configured so that the interaction of the opening and the first protrusion and the interaction of the hollow and the second protrusion secures the coupling portion to the fuel cap such that the fuel cap may be rotated by grasping and rotating the grip portion.

11. The snap-on fuel cap cover of claim 10, wherein the coupling portion further includes a relief slot on either side of the U-shaped snap feature, so that the U-shaped snap feature is located between the two relief slots.

12. The snap-on fuel cap cover of claim 10, wherein the coupling portion further includes a plurality of openings and a plurality of hollows.

13. The snap-on fuel cap cover of claim 12, wherein the openings and the hollows are evenly spaced in an alternating fashion about a circumference of the cylindrical side wall.

14. The snap-on fuel cap cover of claim 10, wherein the hollow has an inner surface shaped similarly to an outer surface of the second protrusion.

* * * * *